United States Patent [19]

Shirasaki

[11] Patent Number: 4,668,052
[45] Date of Patent: May 26, 1987

[54] OPTICAL SWITCH HAVING LOW CROSS-TALK FOR WIDE RANGE OF WAVELENGTHS

[75] Inventor: Masataka Shirasaki, Kawasaki, Japan

[73] Assignee: Fujitsu Limited, Kawasaki, Japan

[21] Appl. No.: 599,241

[22] Filed: Apr. 11, 1984

[30] Foreign Application Priority Data

Apr. 18, 1983 [JP] Japan ................. 58-066906

[51] Int. Cl.[4] ............ B02B 27/28; G02F 1/09
[52] U.S. Cl. ................. 350/377; 350/387; 350/388; 350/405
[58] Field of Search ........... 350/377, 387, 388, 403, 350/405

[56] References Cited

U.S. PATENT DOCUMENTS 3,558,214 1/1971 DeLang et al. ............ 350/388
3,558,215 1/1971 DeLang et al. ............ 350/377

FOREIGN PATENT DOCUMENTS 113019 9/1980 Japan ............... 350/377

OTHER PUBLICATIONS

Jerrard, H. G., "Transmission of Light Through Birefringent & Optically Active Media: The Poincaré Sphere", Jr. Op. Soc. Am. 8-1954, pp. 634-638.
Bennett et al., "Polarization, "Sec 10 of Handbook of Optics", Driscoll et al., Editors, 1978, McGraw Hill, pp. 10-139-140.
Pancharatnam, S., "Achromatic Combinations of Birefringent Plates", Proc. Indian Acad. of Sciences, 4-1955, pp. 130-136.
Bennett et al., "Polarization", Sec. 10 of Hndb. of Optics, Driscoll et al., Editors, McGraw Hill 1978, pp. 10-105.

*Primary Examiner*—William H. Punter
*Attorney, Agent, or Firm*—Staas & Halsey

[57] ABSTRACT

An optical switch including a first polarization converter and a second polarization converter which is provided in series with the first polarization converter.

The first and second converters are able to select as emitted light one of two perpendicular polarized light components of incident light having a desired wavelength ($\lambda_0$) in a polarized state. The first polarization converter converts the incident light having wavelength $\lambda_0$ into a polarized light component corresponding to one of two points positioned on opposite sides of a Poincaré sphere. The two points on the Poincaré sphere are obtained by rotating the incident light $+90°$ or $-90°$. The incident light is rotated around an axis perpendicular to an axis passing through a point corresponding to the incident light on the Poincaré sphere and the center of the Poincaré sphere. The second polarization converter converts the polarized light obtained by the first polarization converter into polarized light corresponding to a point obtained by rotating the two polarized light components at $+90°$ or $-90°$ around an axis passing through the above-mentioned two points on the Poincaré sphere.

24 Claims, 10 Drawing Figures 4,668,052

OPTICAL SWITCH HAVING LOW CROSS-TALK FOR WIDE RANGE OF WAVELENGTHS

BACKGROUD OF THE INVENTION

1. Field of the Invention

The present invention relates to an optical switch, more particularly to an optical switch provided with an element for converting an optical polarization plane, such as a Faraday rotator or an element using an electric optical effect (hereinafter, "electro-optic element").

2. Description of the Prior Art

Optical switches, integral components of optical communication systems, generally make use of Faraday rotators or electro-optic elements so as to convert a plane of polarization of light into two perpendicular polarized light components.

Such optical switches, however, are effective only for light having predetermined wavelengths. If the light has a wavelength other than the predetermined wavelength, the converted polarized light components will not be perpendicular, resulting in cross talk and obstructing correct optical communications.

SUMMARY OF THE INVENTION

It is an object of the present invention to provide an optical switch whose effectiveness is independent of the wavelength of light.

It is another object to provide an optical switch which has a high extinction ratio.

It is still another object to provide an optical switch enabling correct optical communications.

According to the present invention, there is provided an optical switch comprising a first polarization converter and a second polarization converter provided in series with the first polarization converter. The first and second converters are able to select as emitted light one of two perpendicular polarized light components of incident light having a desired wavelength ($\lambda_0$) in a polarized state. The first polarization converter converts the incident light having the wavelength $\lambda_0$ into a polarized light component corresponding to one of two points positioned on opposite sides of a Poincaré sphere and obtained by rotating the incident light $+90°$ or $-90°$ around an axis perpendicular to an axis passing through a point corresponding to the incident light on the Poincaré sphere and the center of the Poincaré sphere. The second polarization converter converts the polarized light obtained by the first polarization converter into polarized light corresponding to a point obtained by rotating the two polarized light components $+90°$ or $-90°$ around an axis passing through the above-mentioned two points on the Poincaré sphere.

BRIEF DESCRIPTION OF THE DRAWINGS

Further objects and advantages of the present invention will be apparent from the following description made in reference to the accompanying drawings, in which.

DESCRIPTION OF THE PREFERRED EMBODIMENTS

Before describing the preferred embodiments of the present invention, a more detailed explanation of the prior art will be given for reference purposes.

Figure 1:
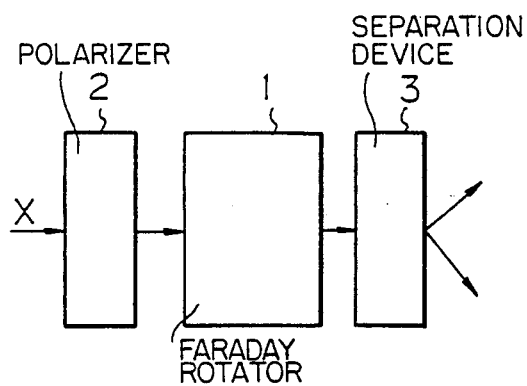
FIG. 1 is a schematic diagram of a conventional optical switch.

FIG. 1 is a schematic view of a conventional optical switch. As shown in FIG. 1, a conventional optical switch comprises a Faraday rotator 1, a polarizer 2, and a polarized light separation device 3. A 45° Faraday rotator made of, for example, yttrium-iron-garnet (YIG) is preferably used. A magnet (not shown) is placed over the Faraday rotator 1.

Figure 2:
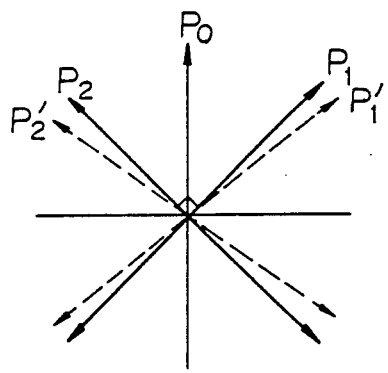
FIG. 2 is a diagram for explaining a polarization state of the optical switch of FIG. 1.

In such an optical switch, when light X linearly polarized by the polarizer 2 is passed through the 45° Faraday rotator 1, polarized light $P_1$ and $P_2$ rotated $\pm 45°$ or $-45°$ around the passing direction with respect to the incident light $P_0$ according to the direction of the magnetic field in the Faraday rotator 1 are obtained, as shown in FIG. 2. The polarized light $P_1$ and $P_2$ may, if desired, be passed through an analyzer (not shown).

This polarization of light is efficiently effected only for light having a certain wavelength. Namely, the Faraday rotator 1 is designed for polarization of only light having a wavelength $\lambda_0$. To rotate by 45° linearly polarized light having, for example, a wavelength of 1.3 $\mu$m, a 45° Faraday rotator having a length of 2.1 mm is necessary.

Figure 3:
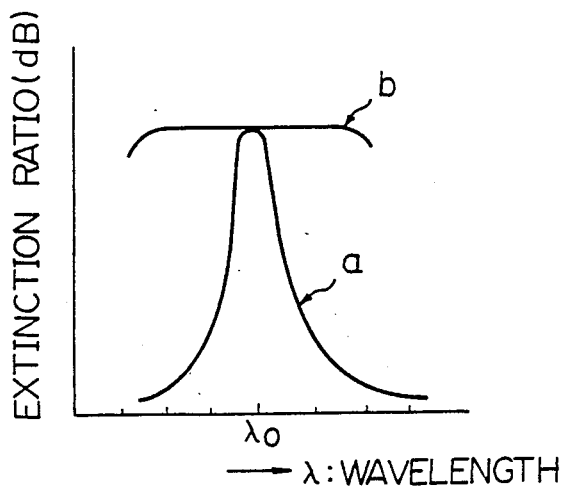
FIG. 3 is a graph of the relationship between wavelength and an extinction ratio in an optical switch.

When, the wavelength is shorter than that required, the Faraday rotation is deviated to $P_1'$ and $P_2'$ shown in FIG. 2, resulting in crosstalk in the optical switch. Thus, when the wavelength deviates from the required value, i.e., $\lambda_0$, the extinction ratio of the optical switch is severely lowered, as shown in FIG. 3.

Figure 4:
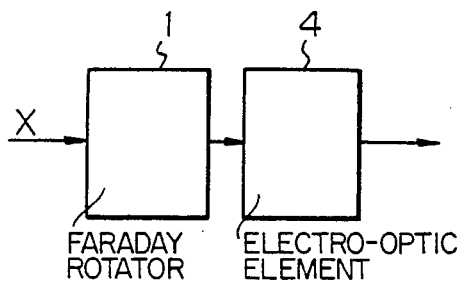
FIGS. 4 and 5 are schematic diagrams of embodiments of the present invention, constituting a polarization converting portion of an optical switch with a Faraday rotator and an electro-optic device.
Figure 5:
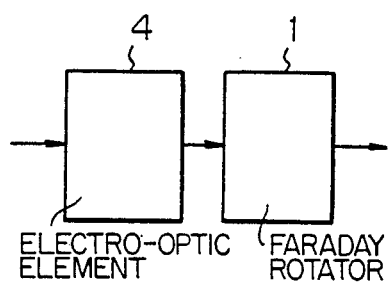

FIGS. 4 and 5 are schematic diagrams of first and second embodiments of an optical switch according to the present invention, respectively polarization.

As shown in FIG. 4, a polarization converting portion of an optical switch comprises a 45° Faraday rotator 1 and an electro-optic element 4.

In this optical switch, the direction of the principal axis of the electro-optic element 4 corresponds with the direction of polarized light incident thereto. Further, the electro-optic element 4 is operated at voltages corresponding to a phase difference of $+/-90°$ with respect to the wavelength $\lambda_0$.

In the optical switch of FIG. 4, the 45° Faraday rotator 1 has a wavelength dependency. Thus, when a deviation $\Delta\lambda$ in the wavelength of light passing through the Faraday rotator 1 occurs, a deviation corresponding to $k\Delta\lambda$ (k: a constant determined by the Faraday rotator) occurs in the angle of optical rotation.

Figure 6:
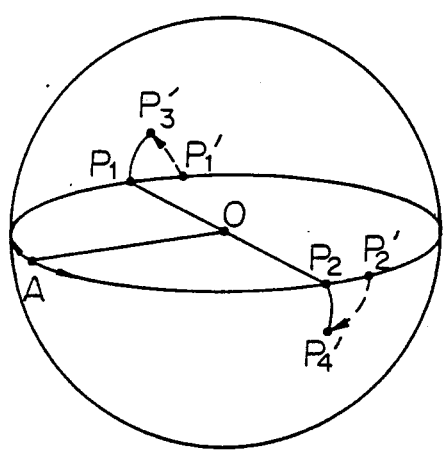
FIG. 6 is a diagram for explaining the polarization conversion in the embodiment of FIG. 4 with reference to a Poincaré sphere.

FIG. 6 is a diagram for explaining polarization conversion in the embodiment of FIG. 4 with reference to a Poincaré sphere. Linearly polarized light incident to the Faraday rotator 1 in FIG. 4 is shown as a point A on the equator of the Poincaré sphere of FIG. 6. When the wavelength of the light is $\lambda_0$, the point A is rotated by +90° or −90° around the axis passing through the Arctic and the Antarctic points of the Poincaré sphere by the Faraday rotator, whereby the point A is moved to a point $P_1$ or a point $P_2$.

When the wavelength of the light has deviated, the point $P_1$ or the point $P_2$ moves along the equator of the sphere. As shown in FIG. 6, the points $P_1$ and $P_2$ are moved to points $P_1'$ and $P_2'$ respectively when the wavelength of the light is shorter than $\lambda_0$.

Then, the points $P_1'$ and $P_2'$ are rotated by +90° and −90° with respect to an axis passing through the points $P_1$ and $P_2$ by using the electro-optic element 4, which operates as the second polarization converter, and the points $P_1'$ and $P_2'$ aremoved to points $P_3'$ and $P_4'$, respectively. As a result, the points $P_3'$ and $P_4'$ are arranged so that they are substantially opposed to each other with respect to the center O of the Poincaré sphere. This mechanism will be explained with reference to FIG. 8, which is a diagram for explaining FIG. 6 in detail.

Figure 8:
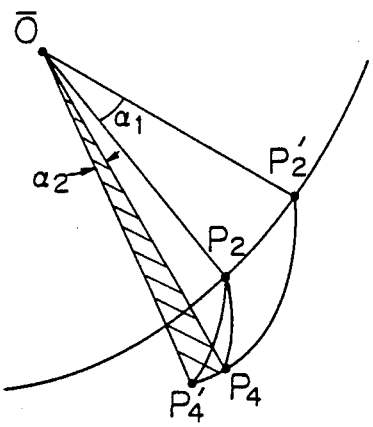
FIG. 8 is a diagram for explaining FIG. 6 in detail.

In FIG. 8, the deviated point $P_2'$ of the point $P_2$ is shown. The point $P_2'$ of a shorter wavelength is moved not to the point $P_4$ rotated by 90° from the point $P_2$, but to the point $P_4'$ rotated more than the point $P_4$. In this case, the deviation angle $\alpha_2$ formed by lines $P_4\overline{O}$ and $P_4'\overline{O}$, is remarkably small and negligible in comparison with the deviation angle $\alpha_1$ due to only the first polarization.

Thus, the points $P_3'$ and $P_4'$ are oppositely arranged on the Poincaré sphere with respect to the center thereof, with the result that polarized light corresponding to the point $P_3'$ is perpendicular with polarized light corresponding to the point $P_4'$.

Figure 7:
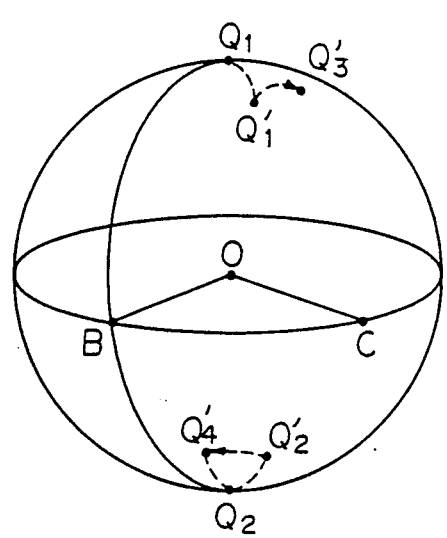
FIG. 7 is a diagram for explaining polarization conversion in the embodiment of FIG. 5 with reference to a Poincaré sphere.

FIG. 7 is a diagram for explaining the polarization conversion in the embodiment of FIG. 5. In FIG. 5, the electro-optic element 4 is arranged so that the direction of the principal axis is slanted by 45° to the direction of polarized light incident on the electro-optic element 4. Linearly polarized light incident on the electro-optic element 4 is shown as a point B positioned on the equator of the Poincaré sphere. The linearly polarized light, having a wavelength of $\lambda_0$, is rotated by +90° or −90° around an axis $\overline{CO}$ perpendicular to an axis $\overline{BO}$ passing through the point B and the center O of the Poincaré sphere, by using the electro-optic element 4. As a result, the point B is moved to the point $Q_2$ or $Q_2$, i.e., the Arctic point or the Antarctic point.

When the wavelength of light is deviated from the required wavelength, the point $Q_1$ or $Q_2$ is moved along the curved line passing through the points $Q_1$, B, and $Q_2$. Namely, as shown in FIG. 7, the points $Q_1$ and $Q_2$ are moved to points $Q_1'$ and $Q_2'$ when the wavelength of the light is shorter than $\lambda_0$.

Then, points $Q_1'$ and $Q_2'$ are rotated by +90° and −90° with respect to an axis passing through the points $Q_1$ and $Q_2$ by using the Faraday rotator 1, which is operated as the second polarization converter, and the points $Q_1'$ and $Q_2'$ are moved to points $Q_3'$ and $Q_4'$. As a result, the points $Q_3'$ and $Q_4'$ are arranged so that they are substantially opposed to each other with respect to the center of the Poincaré sphere, and polarized light corresponding to the point $Q_3'$ is perpendicular with polarized light corresponding to the point $Q_4'$.

Figure 9:
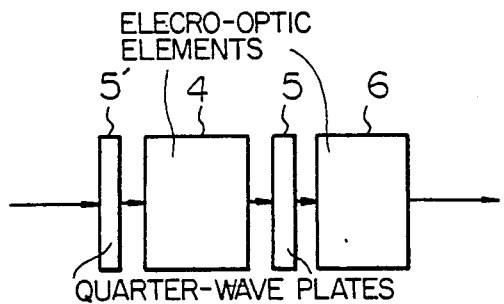
FIGS. 9 and 10 are schematic diagrams showing other embodiments of the present invention, constituting a polarization converting portion of an optical switch with electro-optic devices or Faraday rotators.
Figure 10:
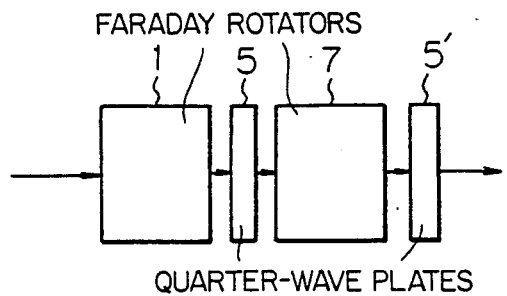

FIGS. 9 and 10 are schematic diagrams showing other embodiments of the present invention, constituting a polarization converting portion consisting of an optical switch with electro-optic devices and Faraday rotators.

As shown in FIG. 9, a polarization converting portion of an optical switch consists of an electro-optic element 4, a quarter-wave plate 5, an electro-optic element 6, and a quarter-wave plate 5'. The plate 5' is used only for rotation of light.

The polarization converting portion of an optical switch, shown in FIG. 9, corresponds to that shown in FIG. 4, except the Faraday rotator 1 is replaced by the electro-optic element 4 and the quarter-wave plate 5.

The quarter-wave plates 5 and 5' give a phase difference of 90° to incident polarized light and have no wavelength dependency. The principal axis of the quarter-wave plate 5 is parallel or perpendicular to a plane of polarization in linearly polarized light incident on the first polarization converter, i.e., the electro-optic element 4.

Since the electro-optic device 4 in FIG. 9 is the same as the electro-optic element 4 in FIG. 5, the conversion of the linearly polarized light on the electro-optic device 4 in FIG. 9 is the same as that explained with reference to FIG. 7, in which the point B is converted to the points $Q_1$ and $Q_2$. After the conversion of light by the electro-optic element 4, the converted light shown as the points $Q_1$ and $Q_2$ in FIG. 7 is rotated by 90° around the axis BO by passing through the quarter-wave plate 5, with the result that the points $Q_1$ and $Q_2$ in FIG. 7 are converted to points corresponding to points $P_1$ and $P_2$ on the Poincaré sphere shown in FIG. 6. Thus, the functions of the electro-optic element 4 and the quarter-wave plate 5 in FIG. 9 are the same as that of the Faraday rotator 1 in FIG. 4.

In FIG. 10, the polarization converting portion of an optical switch consists of a Faraday rotator 1, a quarter-wave plate 5, a Faraday rotator 7, and a quarterwave plate 5'. The plate 5' is used only for rotation of light.

The polarization converting portion of an optical switch, shown in FIG. 10 corresponds to that shown in FIG. 5, except the electro-optic element 4 is replaced by the Faraday rotator 1 and the quarter-wave plate 5.

Since the Faraday rotator 1 in FIG. 10 is the same as the Faraday rotator 1 in FIG. 4, the conversion of the linearly polarized light by the Faraday rotator 1 in FIG. 10 is the same as that explained with reference to FIG. 6, in which the point A is converted to the points $P_1$ and $P_2$.

After the conversion of light by the Faraday rotator 1, the converted light shown as the points $P_1$ and $P_2$ in FIG. 6 is rotated by 90° around the axis AO by passing through the quarter-wave plate 5, with the result that the points $P_1$ and $P_2$ in FIG. 6 are converted to points corresponding to points $Q_1$ and $Q_2$ on the Poincaré sphere shown in FIG. 7.

Thus, the functions of the Faraday rotator 1 and the quarter-wave plate 5 in FIG. 10 are the same as that of the electro-optic device 4 in FIG. 5.

In an optical switch according to the present invention, each of the first and the second polarization converters simultaneously convert light at the rotational angles of +90° and −90° on the Poincaré sphere.

Further, to make a plurality of final points on the Poincaré sphere, for example, a plurality of points $P_4'$ obtained by slight dependency of wavelength, fit one point on the Poincaré sphere, a different half wave plate (not shown) may be used in the optical switch.

According to the present invention, even though light emitted from a first polarization converter is converted into one of two non-perpendicular light components, the two light components can be made substantially perpendicular by providing the second polarization converter in series with the first polarization converter, thereby reducing cross talk due to deviation of the wavelength. Namely, the extinction ratio is maintained high over a wide range of wavelengths as shown in FIG. 3.

According to the present invention, a YIG 45° Faraday rotator is preferably used as the Faraday rotator, and lithium tantalate (LiTaO$_3$) or lithium niobate (LiNbO$_3$) is preferably used for the electro-optic element.

I claim:

1. An optical switch for light having wavelengths $\lambda_0$ and other than $\lambda_0$, comprising:
   a first polizaration converter;
   a second polarization converter provided in series with the first polarization converter;
   said first converter and said second converter being able to select as emitted light one of two perpendicular polarized light components of incident light having wavelengths $\lambda_0$ and other than $\lambda_0$ in a polarized state;
   said first polarization converter converting said incident light having wavelength $\lambda_0$ into a polarized light component corresponding to one of two points positioned on opposite sides of a Poincaré sphere, the two points being obtained by rotating said incident light +90° or −90° around an axis perpendicular to an axis passing through a point corresponding to said incident light on the Poincaré sphere and the center of the Poincaré sphere, and rotating the wavelengths other than $\lambda_0$ an amount different from 90° about the same axis; and
   said second polarization converter converting said polarized light at wavelengths other than $\lambda_0$ obtained by said first polarization converter into polarized light corresponding to a point obtained by rotated said two polarized light components +90° or −90° around an axis passing through the above-mentioned two points on the Poincaré sphere.

2. An optical switch according to claim 1, wherein, in said first and second polarization converters, mutual conversion between the rotational angle of +90° and −90° on the Poincaré sphere is simultaneously carried out.

3. An optical switch according to claim 1, wherein said first polarization converter is a Faraday rotator and said second polarization converter is an electro-optic element.

4. An optical switch according to claim 1, wherein said first polarization converter is an electro-optic element and said second polarization converter is a Faraday rotator.

5. An optical switch according to claim 1, wherein both said first and second polarization converters are Faraday rotators or electro-optic elements;
   and a λ/4 phase difference device is provided between said first and second polarization converters.

6. An optical switch according to claim 3, wherein said Faraday rotator is a 45° Faraday rotator made of Yttrium-iron-garnet (YIG).

7. An optical switch according to claim 4, wherein said Faraday rotator is a 45° Faraday rotator made of Yttrium-iron-garnet (YIG).

8. An optical switch according to claim 5, wherein said Faraday rotator is a 45° Faraday rotator made of Yttrium-iron-garnet (YIG).

9. An optical switch according to claim 3, wherein said electro-optic element is lithium tantalate (LitaO$_3$) or lithium niobate (LiNbO$_3$).

10. An optical switch according to claim 4, wherein said electro-optic element is lithium tantalate (LitaO$_3$) or lithium niobate (LiNbO$_3$).

11. An optical switch according to claim 5, wherein said electro-optic element is lithium tantalate (LitaO$_3$) or lithium niobate (LiNbO$_3$).

12. An optical switch for light having wavelengths $\lambda_0$ and other than $\lambda_0$, comprising:
   a first polarization converter including means for converting incident light having wavelength $\lambda_0$ into a polarized light component corresponding to one of two points positioned on opposite sides of a Poincaré sphere, the two points being obtained by rotating the incident light substantially +90° or substantially −90° around an axis substantially perpendicular to an axis passing through a point on the Poincaré sphere corresponding to the incident light and the center of the Poincaré sphere, and rotating the wavelengths other than $\lambda_0$ an amount different from 90° about the same axis;
   a second polarization converter, provided in series with the first polarization converter including means for converting the polarized light at wavelengths other than $\lambda_0$ emitted from the first polarization converter into polarized light corresponding to a point on the Poincaré sphere obtained by rotating the two polarized light components substantially +90° or substantially −90° around an axis passing through the two above-mentioned points on the Poincaré sphere, so that the optical switch selects from the incident light and emits one of two substantially perpendicular polarized light components having the desired wavelength $\lambda_0$ in the polarized state.

13. An optical switch according to claim 12, wherein the first polarization converter is a Faraday rotator and the second polarization converter is an electro-optic element.

14. An optical switch according to claim 12, wherein the first polarization converter is an electro-optic element and the second polarization converter is a Faraday rotator.

15. An optical switch according to claim 13, wherein said Faraday rotator is a 45° Faraday rotator formed of Yttrium-iron-garnet (YIG).

16. An optical switch according to claim 14, wherein said Faraday rotator is a 45° Faraday rotator formed of Yttrium-iron-garnet (YIG).

17. An optical switch according to claim 13, wherein said electro-optic element is formed of lithium tantalate (LitaO$_3$) or lithium niobate (LiNbO$_3$).

18. An optical switch according to claim 14, wherein said electro-optical element is formed of lithium tantalate (LitaO$_3$) or lithium niobate (LiNbO$_3$).

19. An optical switch according to claim 12, wherein the first polarization converter comprises a first quarter wave plate and a first electro-optic element and the second polarization converter comprises a second quarter wave plate and a second electro-optic element.

20. An optical switch according to claim 12, wherein the first polarization converter comprises a first Faraday rotator and a first quarter wave plate and the second polarization converter comprises a second Faraday rotator and a second quarter wave plate.

21. An optical switch according to claim 19, wherein the first electro-optical element is formed of lithium tantalate (LitaO$_3$) or lithium (LiNbO$_3$) and said second electro-optical element is formed of lithium tantalate (LitaO$_3$) or lithium niobate (LiNbO$_3$).

22. An optical switch according to claim 20, wherein the first and second Faraday rotators are 45° Faraday rotators formed of Yttrium-iron-garnet (YIG).

23. An optical switch according to claim 19, wherein the first quarter wave plate is used only for rotation of light.

24. An optical switch according to claim 20, wherein the second quarter wave plate is used only for rotation of light.

* * * * *

UNITED STATES PATENT AND TRADEMARK OFFICE
CERTIFICATE OF CORRECTION

PATENT NO. : 4,668,052

DATED : May 26, 1987

INVENTOR(S) : Masataka Shirasaki

It is certified that error appears in the above-identified patent and that said Letters Patent is hereby corrected as shown below:

Column 2, line 9, change "detail," to --detail;--;

line 51, delete "polarization";

line 60, change "$\lambda_0$." to --$\lambda_0$, and is equivalent to a quarter-wave plate.--.

Column 3, line 51, change "$Q_2$" (first occurrence) to --$Q_1$--.

Column 5, line 3, change "though" to --if--;

line 21, change "polizaration" to --polarization--.

Signed and Sealed this

Tenth Day of November, 1987

Attest:

DONALD J. QUIGG

Attesting Officer

Commissioner of Patents and Trademarks